United States Patent
Nyce et al.

(10) Patent No.: US 9,284,710 B2
(45) Date of Patent: Mar. 15, 2016

(54) PREFABRICATED CONCRETE POLE BASE AND ADJUSTABLE CONNECTOR

(71) Applicant: Oldcastle Precast, Inc., Littleton, CO (US)

(72) Inventors: Daniel Nyce, Perkasie, PA (US); Kelly Patterson, Parker, CO (US); George Clinton Brookhart, Littleton, CO (US)

(73) Assignee: Oldcastle Precast, Inc., Littleton, CO (US)

( * ) Notice: Subject to any disclaimer, the term of this patent is extended or adjusted under 35 U.S.C. 154(b) by 0 days.

(21) Appl. No.: 14/574,104

(22) Filed: Dec. 17, 2014

(65) Prior Publication Data

US 2015/0101265 A1  Apr. 16, 2015

Related U.S. Application Data

(63) Continuation of application No. 13/568,807, filed on Aug. 7, 2012, now Pat. No. 8,938,923, which is a continuation-in-part of application No. 13/536,013, filed on Jun. 28, 2012, now abandoned.

(60) Provisional application No. 61/502,460, filed on Jun. 29, 2011.

(51) Int. Cl.
| | |
|---|---|
| *E02D 27/42* | (2006.01) |
| *E04H 12/22* | (2006.01) |
| *E04B 1/41* | (2006.01) |
| *E04B 1/21* | (2006.01) |
| *E04H 12/12* | (2006.01) |

(Continued)

(52) U.S. Cl.
CPC ............... *E02D 27/42* (2013.01); *E04B 1/215* (2013.01); *E04B 1/4114* (2013.01); *E04B 1/4128* (2013.01); *E04H 12/12* (2013.01); *E04H 12/2253* (2013.01); *E04H 12/2261* (2013.01); *E04H 12/2269* (2013.01); *E04B 1/4107* (2013.01); *E04B 1/4135* (2013.01); *E04B 2001/246* (2013.01); *E04B 2001/2415* (2013.01); *F16B 7/187* (2013.01)

(58) Field of Classification Search
CPC ....... E02D 27/42; F16B 7/187; E04B 1/4128; E04B 1/4114; E04B 1/4107; E04B 1/215; E04B 2001/246; E04H 12/2269; E04H 12/2261; E04H 12/2253; E04H 12/12
See application file for complete search history.

(56) References Cited

U.S. PATENT DOCUMENTS

| | | |
|---|---|---|
| 1,491,571 A | 4/1924 | Tomkinson et al. |
| 1,529,895 A | 3/1925 | La Chance et al. |

(Continued)

OTHER PUBLICATIONS

Binghamton Precast and Supply Corp., "Universal Light Pole Foundation", Product Brochure, Binghamton, New York, http://www.binghamtonprecast.com/pagezonesiteresources/binghamtonprecastresources/file/pdf/universallpb_cat_processed_sm.pdf, accessed by applicants on May 9, 2014 and contains metadata starting creaton on May 3, 2013, 33 pages.

(Continued)

*Primary Examiner* — Andrew J Triggs
(74) *Attorney, Agent, or Firm* — Kilpatrick Townsend & Stockton LLP

(57) ABSTRACT

A prefabricated concrete pole base and adjustable method of connection and use to receive, support, and stabilize light poles and the like having different hole mounting patterns, securing the pole to the base and facilitating rapid installation of poles while eliminating the need for on-site concrete forms and lengthy concrete cure times.

27 Claims, 8 Drawing Sheets

(51) Int. Cl.
*F16B 7/18* (2006.01)
*E04B 1/24* (2006.01)

(56) References Cited

U.S. PATENT DOCUMENTS

| | | | |
|---|---|---|---|
| 1,585,254 A | 5/1926 | Lund et al. | |
| 1,723,376 A | 8/1929 | Rutherford | |
| 2,374,624 A | 4/1945 | Schwendt | |
| 2,527,063 A | 10/1950 | Pearce | |
| 3,204,493 A | 9/1965 | Severdia | |
| 3,210,899 A | 10/1965 | Pfaff, Jr. et al. | |
| 3,343,322 A | 9/1967 | Lurkis et al. | |
| 3,563,502 A | 2/1971 | Dayson | |
| 3,918,229 A | 11/1975 | Schweinberger | |
| 3,988,870 A * | 11/1976 | Snavely | 52/296 |
| 4,050,211 A * | 9/1977 | Wahman | 405/251 |
| 4,295,308 A | 10/1981 | Korfanta | |
| 4,587,782 A | 5/1986 | Shubow | |
| 4,674,907 A | 6/1987 | Shewchuk | |
| 4,793,111 A | 12/1988 | Shewchuk | |
| 4,972,642 A | 11/1990 | Strobl, Jr. | |
| 5,400,997 A | 3/1995 | Payne et al. | |
| 5,632,464 A | 5/1997 | Aberle | |
| 5,671,814 A * | 9/1997 | Smith | 173/91 |
| 5,740,645 A | 4/1998 | Raby | |
| 5,746,036 A | 5/1998 | Angelette | |
| 5,855,342 A * | 1/1999 | Hawkins et al. | 248/68.1 |
| 5,878,540 A | 3/1999 | Morstein | |
| 5,882,540 A | 3/1999 | Farrington | |
| 6,202,371 B1 | 3/2001 | Natelli, Jr. | |
| 6,305,650 B1 * | 10/2001 | Hawkins et al. | 248/68.1 |
| 6,484,471 B2 * | 11/2002 | Steed et al. | 52/704 |
| 6,643,945 B1 | 11/2003 | Starks | |
| 6,709,172 B2 | 3/2004 | Brown | |
| 6,722,821 B1 | 4/2004 | Perko et al. | |
| 6,868,641 B2 | 3/2005 | Conner et al. | |
| 6,886,296 B1 | 5/2005 | John et al. | |
| 7,228,661 B2 | 6/2007 | Rizzotto | |
| 7,237,368 B2 * | 7/2007 | Richardson et al. | 52/707 |
| 7,578,099 B2 | 8/2009 | Schlegel | |
| 7,654,057 B2 * | 2/2010 | Zambelli et al. | 52/710 |
| 7,921,616 B2 | 4/2011 | Reyneveld | |
| 7,930,859 B1 | 4/2011 | Eslambolchi et al. | |
| 7,984,541 B1 | 7/2011 | Davidson | |
| 8,091,839 B2 * | 1/2012 | Whipple et al. | 248/67.7 |
| 8,161,698 B2 | 4/2012 | Migliore | |
| 8,474,780 B2 * | 7/2013 | Parduhn et al. | 248/551 |
| D702,569 S | 4/2014 | Moore | |
| 8,875,451 B1 | 11/2014 | Parduhn et al. | |
| 8,898,991 B2 | 12/2014 | Cali | |
| 8,938,923 B2 * | 1/2015 | Nyce et al. | 52/298 |
| 8,981,903 B2 * | 3/2015 | Daniels et al. | 340/8.1 |
| 8,991,122 B2 * | 3/2015 | Abbey | 52/296 |
| 2007/0039281 A1 | 2/2007 | Zambelli et al. | |
| 2009/0040750 A1 | 2/2009 | Myer | |
| 2009/0279959 A1 | 11/2009 | Bakos | |
| 2010/0205875 A1 | 8/2010 | Rawson-Harris | |
| 2011/0214363 A1 | 9/2011 | Day | |
| 2011/0222957 A1 | 9/2011 | Marques Lito Velez Grilo | |
| 2012/0240482 A1 | 9/2012 | Pitt et al. | |
| 2012/0324825 A1 * | 12/2012 | Vrame | 52/745.21 |
| 2013/0036678 A1 * | 2/2013 | Nyce et al. | 52/105 |
| 2013/0036679 A1 * | 2/2013 | Nyce et al. | 52/105 |
| 2013/0207305 A1 | 8/2013 | Moore | |
| 2014/0174003 A1 | 6/2014 | Despotellis | |
| 2014/0215943 A1 | 8/2014 | Brown | |
| 2015/0027073 A1 * | 1/2015 | Abbey | 52/297 |

OTHER PUBLICATIONS

Recon Wall Systems, Inc., "ReCon Introduces the New Universal Precast Light Pole Foundation", Product Brochure, http://www.reconwalls.com/recon-introduces-universal-precast-light-pole-foundation, dated Feb. 6, 2014, 5 pages.

Non final Office Action in Related U.S. Appl. No. 14/522,655 dated Apr. 8, 2015, 19 pages.

Notice of Allowance in Related U.S. Appl. No. 14/522,655 dated Nov. 23, 2015, 12 pages.

* cited by examiner

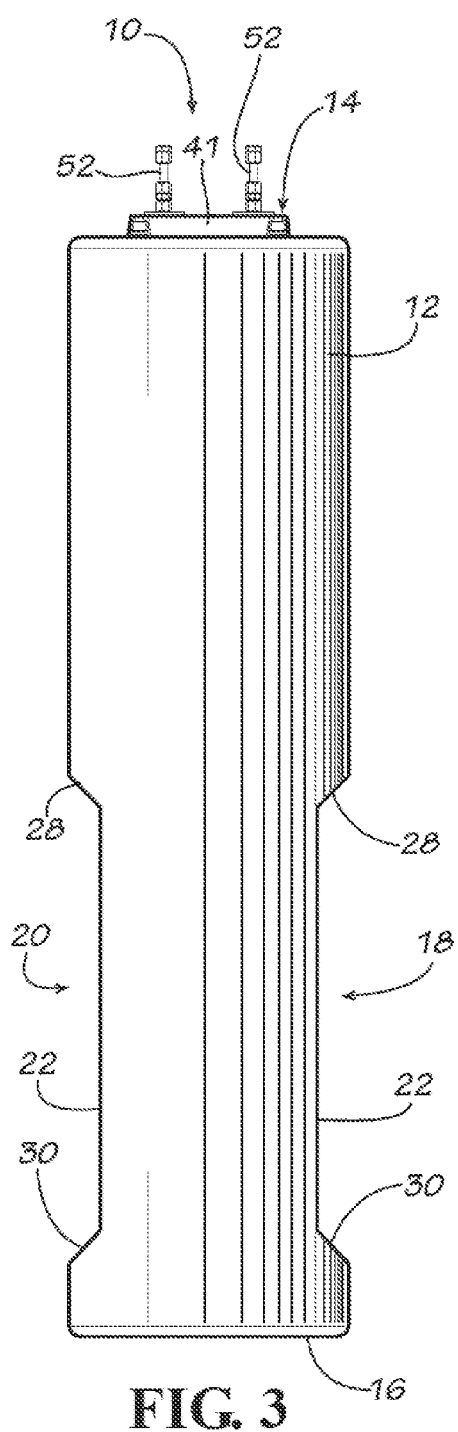
FIG. 3
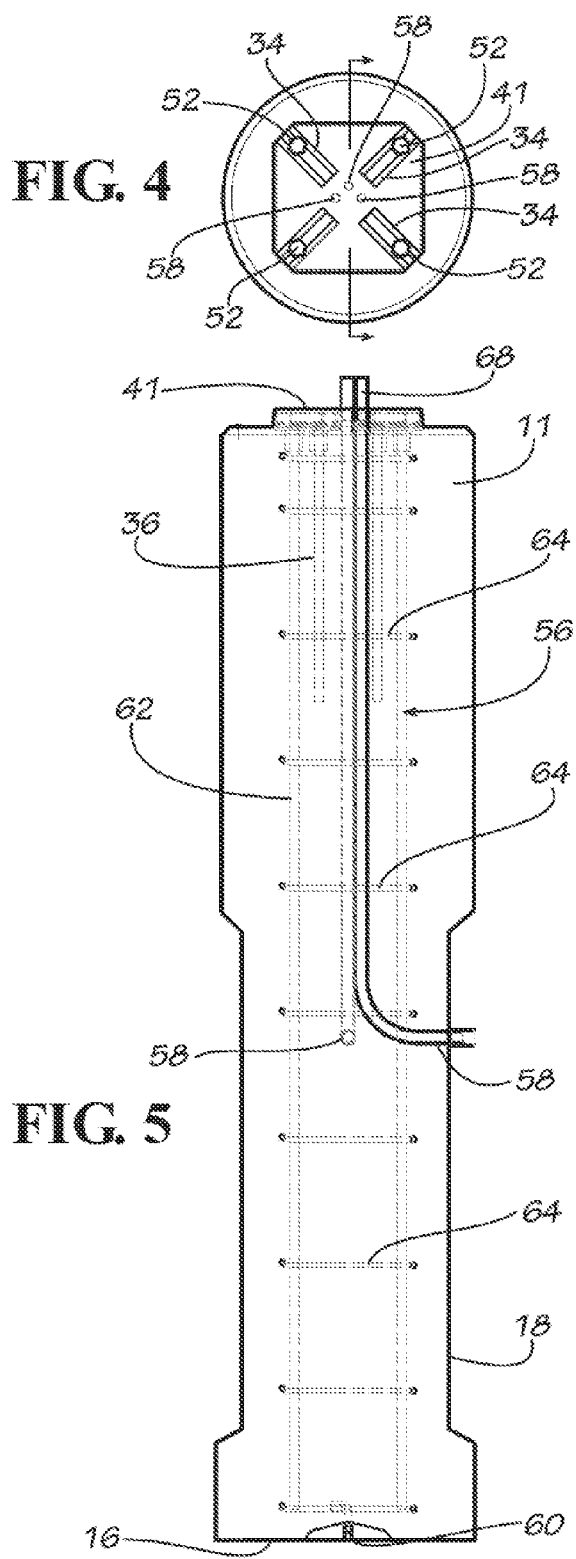
FIG. 4
FIG. 5

PREFABRICATED CONCRETE POLE BASE AND ADJUSTABLE CONNECTOR

CROSS-REFERENCE TO RELATED APPLICATIONS

This application is a continuation application of U.S. Non-Provisional application Ser. No. 13/568,807, filed Aug. 7, 2012, now allowed, which is a continuation-in-part application of U.S. Non-Provisional application Ser. No. 13/536,013 filed Jun. 28, 2012, abandoned, which claims priority to U.S. Provisional Application No. 61/502,460 filed Jun. 29, 2011, all three of which are incorporated herein by reference in their entireties.

FIELD OF THE INVENTION

This invention relates generally to the field of pole supports, specifically including, without limitation, precast concrete pole support bases and methods of manufacture, installation and use.

BACKGROUND

A wide variety of poles and posts are used throughout the world, including lighting poles, electrical, telephone and cable supports and numerous other poles of many different types. Some of these poles are installed by placing a portion of the lower end of the pole in a hole in the ground and filling the remaining space in the hole with soil, concrete or another suitable material. Many wooden poles are installed using this method in which a portion of the pole is buried in the ground. Other poles and similar structures are intended for installation with the lower end of the pole resting on a separate base, the top of which may be positioned at ground level or above ground level. Metal lamp posts are but one of many such poles, posts and other structures frequently installed on a separate, typically concrete, base.

Many poles or posts intended for installation on top of a base or support have attached to the bottom of the pole a horizontal square plate or other structure with a "square" arrangement of four holes, with one hole near each of the four corners of the plate or other structure. This provides four fastening holes arranged at the corners of a square so that each hole is equally distant from each of the other two holes adjacent to it. Each of the holes may be located, for instance, in a foot or boss protruding from the side or end of the pole or a plate secured to the lower end of the pole.

Such a pole is typically installed by securing the plate or other pole-terminating structure with four studs, bolts or other fasteners: (a) protruding vertically from the concrete base and up through the plate or other structure or (b) passing down through the holes in the pole base plate or other structure and into the concrete base. Where studs, pins, bolts or the like are positioned to be received in the holes in the pole base plate or other hole-containing structure, the fasteners must be located carefully during preparation of the base or foundation in order to insure that the fastener spacing matches the locations of the holes in the pole plate or other hole-containing structure. Each stud, pin, bolt or the like is usually the upper end of a long rod or is attached to such a rod or other anchor that extends well down into the base or foundation on which the pole is to be installed.

If one or more studs protruding from a concrete base are sheered off, as often happens when a motor vehicle collides with a pole mounted on such a concrete base, replacement of the pole may be difficult because of the difficulty of attaching new studs to the concrete base.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

This invention provides a pole base, which may be a prefabricated concrete pole base, and that may have an adjustable connection or attachment structure and system of use that is simple to manufacture and install, highly versatile and easy to use. This invention can be used in a wide variety of configurations and alternative structures using numerous known materials and additional suitable materials and components that may be developed in the future.

The attachment structure is adapted to accommodate pole base plates or other structure having differing dimensions. In one embodiment, an X-shaped arrangement of U-shaped cross section (or inverted T-shaped slot) channels support and attach to the bottom of a pole.

The channels may be secured to a pole base body that is typically generally cylindrical in shape with generally round, planar top and bottom surfaces. The height may be approximately four times the diameter of the cylindrical body, but many other proportions and shapes are possible. The body may include one or first and second planar recessed regions disposed on opposing sides with inwardly tapered horizontal surfaces on the top and bottom of the recess. Alternate embodiments of the invention may have various proportions of recess depths and sizes and locations. The channels can be embedded in a square or rectangular protrusion from the planar top of the body or can be embedded directly in the top of the body.

The body may also contain one or more electrical wire chase conduits. The conduits usually run continuous from the top central region of the body and extend downward and exit the body in different desired directions at a side or the bottom.

A lifting anchor may be fastened to the concrete form so that a portion of it protrudes from the bottom of the body. This anchor or hook facilitates lifting and moving the base during and after manufacture, particularly if the base is manufactured upside down.

If one or more studs or bolts securing a pole to the concrete base of this invention are sheered or otherwise broken off, as may happen when a motor vehicle collides with a pole mounted on such a concrete base, replacement of the pole may be easy. This is because the sheered stud or bolt can be easily removed from the channel to which it was secure and replaced, and the pole (if undamaged) or a replacement pole can be mounted on the base as described above. Moreover, the pole bases of this invention make it quick and easy to change poles or pole types mounted on the base.

BRIEF DESCRIPTION OF THE DRAWINGS

Illustrative embodiments of the present invention are described in detail below with reference to the following drawing figures:

FIG. 3 is a side view of the base of FIG. 1.

FIG. 4 is a top view of the base of FIG. 1.

FIG. 5 is an "x-ray-like" version of the same a view as FIG. 3, in which internal structure is visible.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

One embodiment of this invention is a manufactured or prefabricated, typically concrete pole base with an adjustable connection enabling use of the base to support and stabilize light poles, signs, posts and other monopoles having a range of different sizes of attachment plates or other structures. Other embodiments may not be manufactured or prefabricated remote from the location where used or may have numerous other differences.

Figure 1:
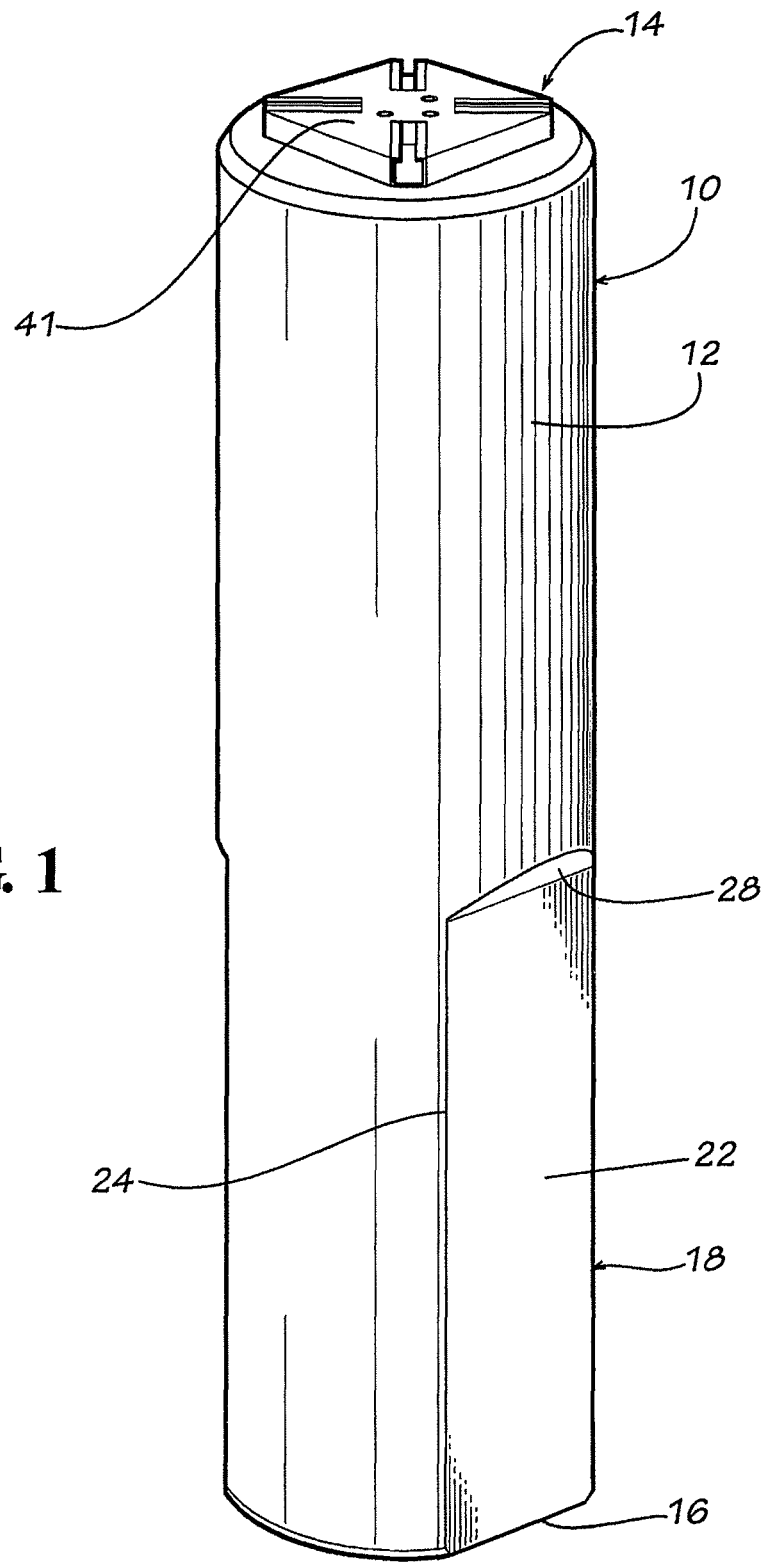
FIG. 1 is an perspective view of the top and a side of one embodiment of the base of this invention.
Figure 9:
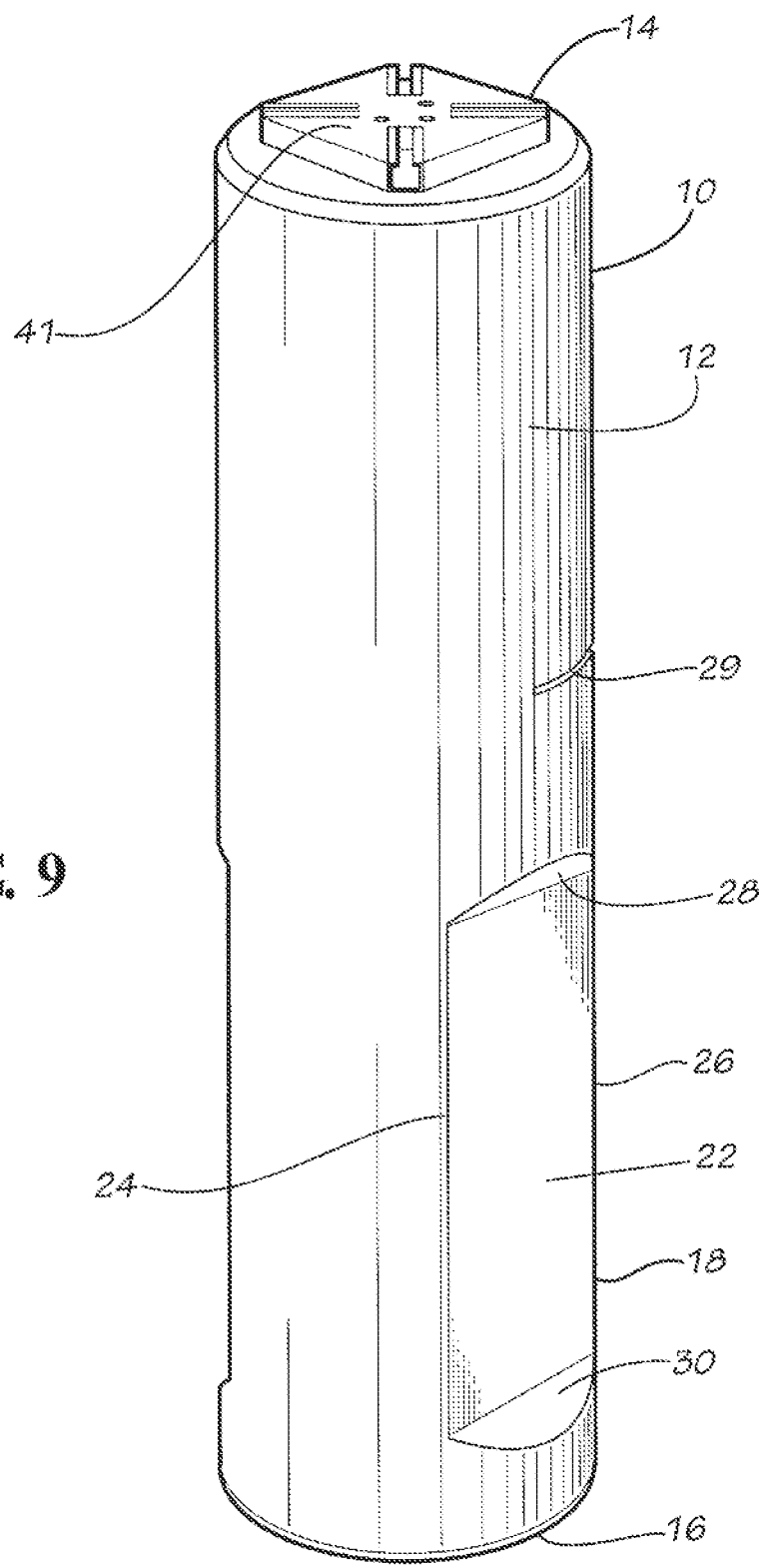
FIG. 9 is a perspective view similar to FIG. 1 of the top and a side of another embodiment of the base of this invention.

The figures depict an exemplary embodiment of the invention in which a generally cylindrical base 10 has a concrete body 11 having a cylindrical wall 12, a top 14, a bottom 16 and two recesses 18 and 20. Recesses 18 and 20 have rectangular, vertical planar portions 22 that intersect the cylindrical wall 12 at vertical arises 24 and 26, the tops and bottoms of which transition to the cylindrical wall 12 along sloping upper transitions 28 and lower transitions 30, as depicted in FIG. 9. Alternatively, recesses 18 and 20 can extend all the way from upper transitions 28 through the bottom 16 of the body, as depicted in FIG. 1.

As depicted in FIG. 9, a notch 29 may be cast in the side of body 11 to indicate "grade," i.e., the depth to which the base 10 is to be buried during installation, where the portion of the body 11 above the notch 29 projects above "grade," or the level of the ground. Notch 29 can be V-shaped or another shape, and other shapes than a notch may be utilized as such an indicator of grade. Other indicia can also be used, including, for instance and without limitation, a metal piece or other object embedded in and visible in or projecting from the body 11, and a marking such as paint applied to the base 11. A recess such as notch 29 formed by mold structure is a practical indicator of grade because it is automatically and accurately incorporated in the body 11 when base 10 is manufactured.

Figure 2:
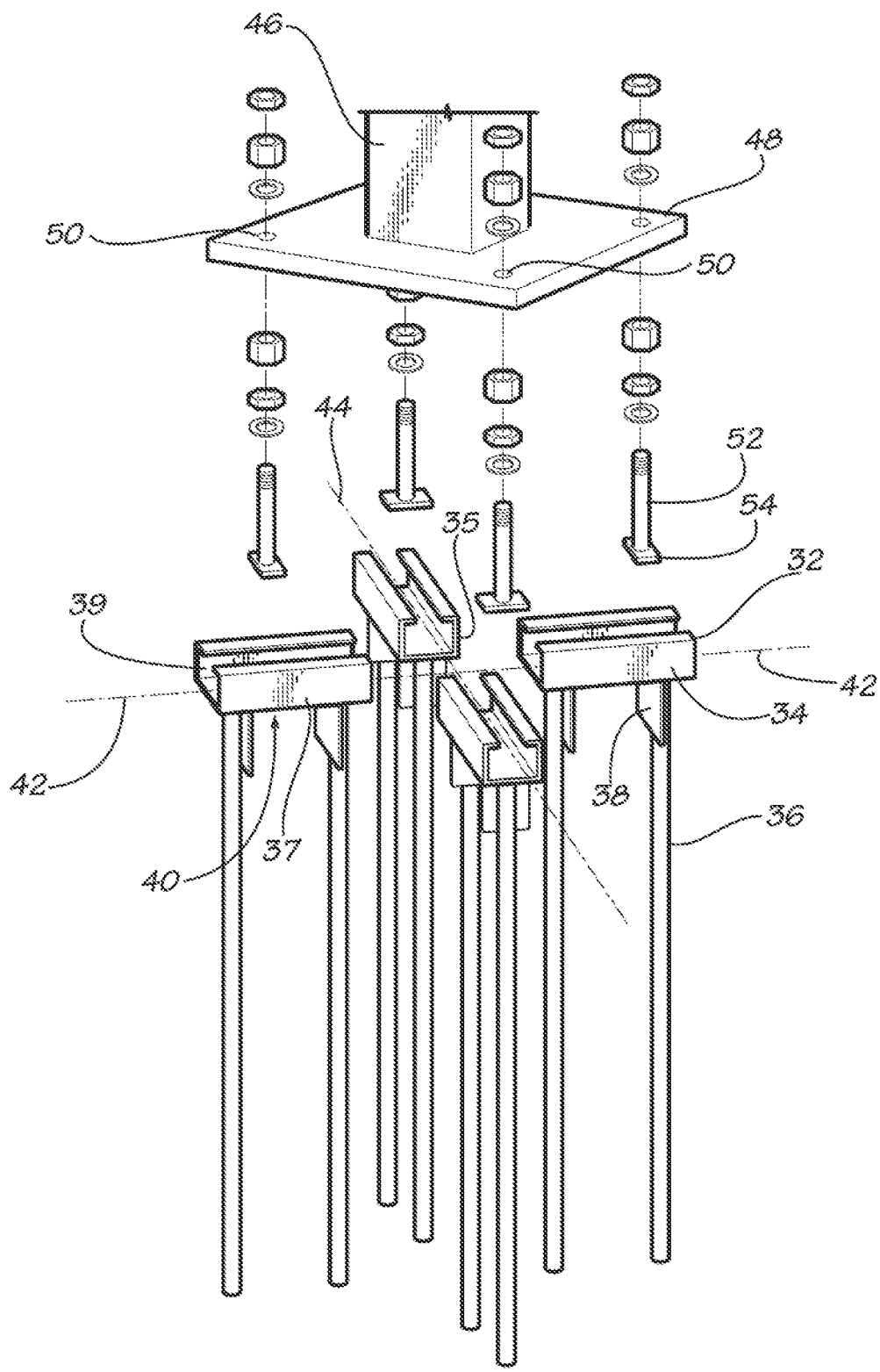
FIG. 2 an exploded perspective view of the attachment components incorporated in the base depicted in FIG. 1, together with the lower portion of a pole and pole base plate of a type that may be installed on the base depicted in FIG. 1.

Structure for attaching a pole to the base 10 is provided by anchors 32 easily seen in FIG. 2. Each anchor 32 may comprise a section of channel 34 positioned in use horizontally on or in the top of body 11. Structure attached to the undersides 40 of anchors 32 is embedded, together with a portion of the anchor 32, in the base 10 to secure the anchor in place. Such securing structure in a first exemplary embodiment depicted in the drawings is two vertical plates 38 and two vertical rods 36, each of which rods 36 is attached to one of the plates 38 and the underside 40 of one of the channels 34. Many other securing structures may be used such as the coupling 94 and threaded rod 100 shown in FIG. 10. Coaxial or aligned pairs of anchors 32 are positioned orthogonal to each other so that the channel axes 42 and 44 and the channels 34 form an X-shape, as may be easily seen in FIG. 4. This permits a pole 46 having a square base plate 48 penetrated by four corner holes 50 to be attached to the base 10 with four bolts, studs or other fasteners 52 typically (but not necessarily) having rectangular heads 54, one of which heads 54 is received in each of channels 34. Because the fastener heads 54 can be positioned in the channels 34 anywhere along the length of the channel, base plates 48 of different sizes can be attached to base 10, provided that the base plate 48 can be positioned so that each of the holes 50 in the base plate 48 is over a portion of one of the channels 34. The same is true of pole attachment holes in other pole termination structures.

As an alternative to bolts, studs or other fasteners 52 positioned with heads 54 received in the channels 34, "T-nuts" and other internally threaded fasteners can be positioned in the channels, and bolts or other fasteners 52 can be passed down through the holes 50 in pole base plate 48, or through other hole-containing structure of pole 46, and into the T-nuts or other internally threaded fasteners.

The base 10 is formed with the channels 34 of anchors 32 at the top 14 of the body 11 and with rods 36 and plates 38 imbedded in the concrete or other material of which the body 11 is cast or otherwise formed. Concrete or other material of which the body 11 is formed can also be positioned between the channels 34 to form an integral monument-like structure 41 on the top of base 10, or the channels can be partially or fully embedded in the body 11.

The X-shaped arrangement of anchors 32 for securing a pole base plate 48 can be attached to other structures such as poured-in-place and prefabricated bases, concrete pads, or building, dam, parking lot, pedestrian walkway, landscaped area, street or road components. Anchors 32 can also be configured as channels secured to other components by bolts, studs or other fasteners passing through or attached to the bottoms 35 or sides 37 of channels 34.

In addition to the anchors 32, reinforcing structure 56, conduits 58, other desired structures such as an anchor or hook 60 can be imbedded in body 11 to reinforce and strengthen the body 11, facilitate connection of electrical or other devices in or on the pole 46 to power sources, controls or other devices and provide lifting structure.

Reinforcement 56 (visible in FIG. 5) can include vertical rebar 62 and generally horizontal, square rebar stirrups 64.

These vertical and horizontal members can be held together for placement in the concrete mold with rebar tie wires, can be welded or can be separate components.

Conduit 58 can run from the top 14 of the body 11 inside the channels 34, down the inside of the body 11 and out through a side of the base 10 through cylindrical wall 12 or one of the planar portions 22 or 28 of one of the recesses 18 or 20. Such positioning of an upper end 68 of conduit 58 in a central location inside the body 11 and channels 34 positions wires or other structures positioned in the conduit 58 to travel directly up the inside of pole 46. While the conduit 58 can bend inside the base and exit to the side, conduit 58 could also exit the bottom 16 of the base 10.

Junction boxes or other desirable structures or components can be positioned on or in body 11 as may be desirable to achieve additional or improved functionality.

Base 10 may be manufactured utilizing a concrete form having multiple connected panels that, when connected, define voids in which embedded structures like reinforcement 56, portions of anchors 32 and conduit 58 are positioned and into which the concrete mixture or other material from which the base is formed is poured. Such a form may be a clam-shell opening form or any other form suitable for manufacturing concrete structures like base 10.

Alternate embodiments of the invention may have various proportions of recess depths and sizes, thereby allowing for the addition or subtraction of mass and thus weight to the body as needed and to provide roll-resisting structure and for other purposes.

Anchors 32 with fastening channels 34 may be "Halfen," "Unistrut" or other similar anchoring channels having a generally U-shaped cross section. Lips on the opposed inside ends of the "U," together with inside walls of the channel form an inverted T-shaped slot and retain appropriately shaped nuts and bolt heads. Such fasteners are sometimes referred to as "Tee-nuts" and Tee-bolts." Anchors 32 also may be obtained from other suppliers or can be fabricated for this application. Anchors 32 can be a wide variety of different sizes and can have a wide variety of different forms provided that the anchor provides structure for attachment of a nut, bolt, stud or other fastener structure that is securely attached or anchored to the base 10.

Figure 8:
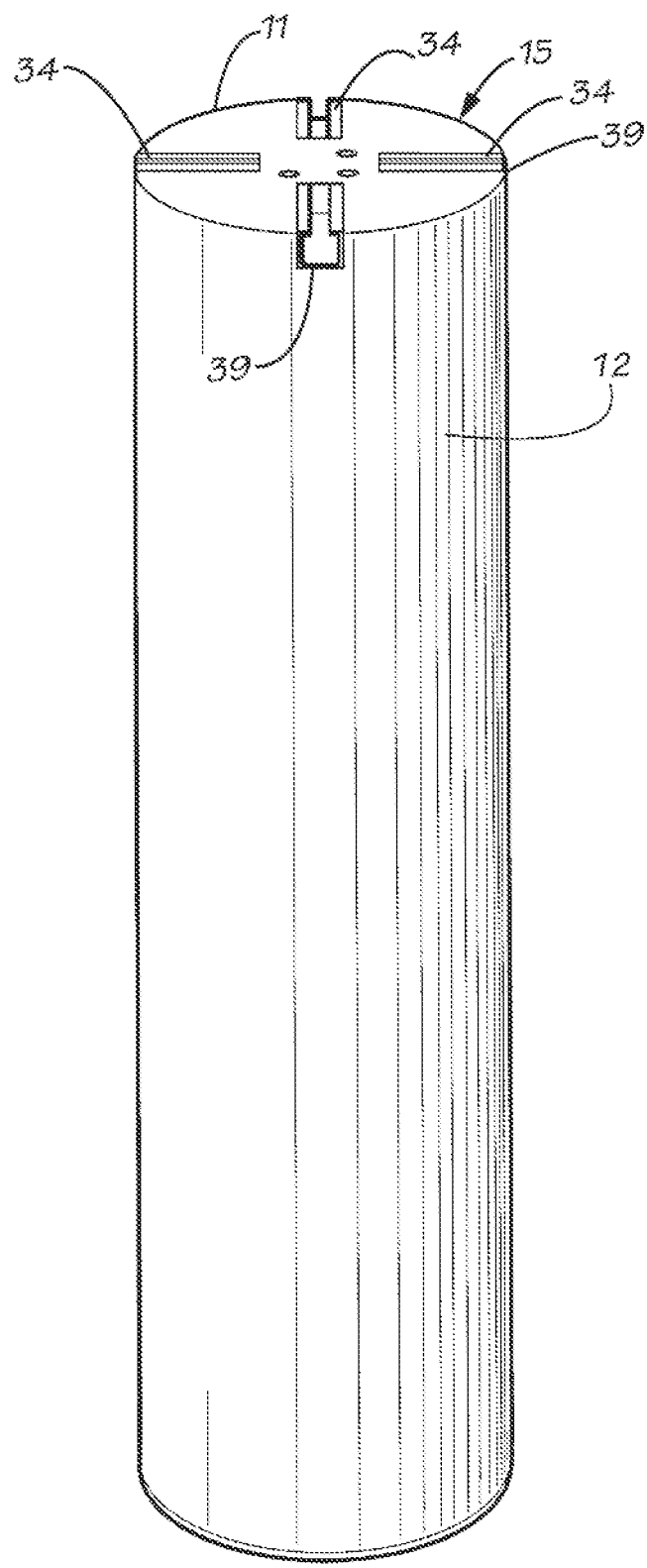
FIG. 8 is a perspective view similar to FIG. 1 of the top and side an alternative embodiment of the pole base of this invention.

The channels 34 are positioned in horizontal positions at the top of the body 11 in a generally X-shaped arrangement, with the outer ends of the channels at the corners of the protrusion or monument 41 at the top 14 of the body 11, and the inner ends 35 of channels 34 facing the center of the protrusion 41. The protrusion 41 is typically square but can also be a rectangle or another shape and can be omitted so that the channels 34 simply sit on top of the body or are partially or fully embedded (as depicted in FIG. 8) in the top of body 11 of pole base 15. If the channels 34 are embedded in the body 11, the outer ends 39 of channels 34 may be flush with the wall 12 of body 11 as shown in FIG. 8, but they need not necessarily be flush with the wall 12.

While it can be beneficial for the outer ends 39 of channels 34 to be open to provide access for positioning or securing fasteners, they need not necessarily be open and can be embedded in the body 11 of base 10 or 15 if either the inner ends of the channels 34 are open so that fasteners can be introduced through the inner ends or if the base 10 or 15 is manufactured with fasteners already positioned in the channels 34.

The fastening channels 34 each have one or more structures, which can be one or more anchoring bars 36 or plates 38 (see FIG. 2) or other shapes (see FIG. 10), fastened to the bottom 40 of the channel 34 and extending downward into the body 11, thereby acting to strengthen the connection between each channel 34 and the body 11. The fastening hardware (typically tee-head bolts or studs or nuts) used to fasten the base of the pole to the channels may be common hardware used in Halfen, Unistrut or similar anchoring structures.

Such Halfen, Unistrut or similar anchors 32 will typically include a channel 34 having a generally U-shaped cross section with an open top forming an inverted T-shaped slot. The channels 34 need to be open at least one end and may have a length typically somewhat less than half of the radius of the cylindrical base 10; however, other anchor structures and dimensions may be used.

Having the center of the "X-shaped" anchor 32 channels 34 open provides an unobstructed region for the conduits 58 to open to the top of the base 10. However, a complete "X-Shaped" structure could be used by having equal length channels 34 that meet in the middle or by having one longer channel 34 and two shorter channels 34 abutting the longer channel on opposite sides in its middle. If one longer and two shorter channels 34 are used, two of the fasteners 52 will be secured in the longer channel 34, and one will be secured in each of the shorter channels 34. Conduits 58 could open to the top of body 11 just to one side of the abutting channels 34 in these alternative configurations.

If abutting channels are welded or otherwise attached to the channel they abut, the desired orientation of the "X-shaped" channels 34 structure can be easily maintained during manufacture of the base 10. Where the channels 34 do not abut, other means will have to be used to maintain the proper relative orientation of the channels during manufacture of the base 10 or during incorporation of the anchors 32 in another structure.

Figure 10:
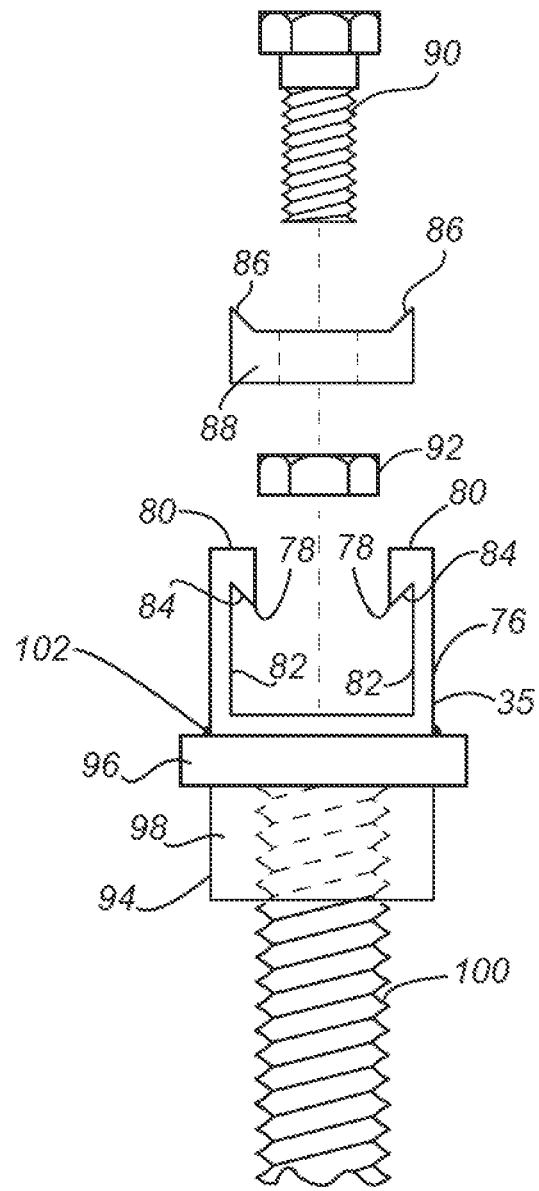
FIG. 10 is an exploded elevation view of an alternative channel and fastener subassembly of the pole base of this invention.

An alternative channel and fastener structure is depicted in FIG. 10. In this alternative, channel 76 is similar to channels 34, but depending sharp or v-shaped lips 78 extend downward from the inward-extending tops 80 of the channel 76, forming inverted v-shaped recesses 84 between the side walls 82 and the lips 78. These recesses 84 receive protrusions 86 on square or rectangular washers 88 through which bolts 90 pass into nuts 92. This arrangement of components and structures can provide especially strong attachment structures, particularly including resistance to force exerted on the fasteners, because, among other reasons, of the engagement between the lips 78 of channel 76 and protrusions 86 of washer washers 88.

Channel 76 rests on and is welded (e.g. with weld bead 102) or otherwise appropriately attached to a threaded coupler 94. In the embodiment of coupler 94 depicted in FIG. 10, a plate 96 to which the channel 76 is attached is welded to or otherwise attached to or formed with a threaded collar 98. Threaded rod 100 seated in collar 98 extends down into the concrete of body 11. One, two or any other suitable number of threaded couplers 94 and rods 100 may be attached to each channel 76

A lifting anchor 60 visible in FIG. 5 is fastened to the main concrete form (not shown) in a manner so as to dispose it at the bottom 16 of the body 11, sufficiently inward from the wall 12 of the body 11 to allow a substantial portion of the anchor 60 to be embedded in the body 11. The lifting anchor 60 may vary in type and size while still performing the intended purpose and function of providing a structure by which base 10 can be lifted.

The reinforcing structure 56 is positioned in the form (not shown) prior to the introduction of concrete mixture or other material of which the body is formed and will serve to reinforce the structural integrity of the base body 11 when the fabrication process is complete. Reinforcement 56 may be comprised of one or a multitude of steel reinforcement members in the form of a single reinforcing member or a framework of multiple reinforcing members that form a structure having a diameter, length, width, and height that are sufficiently less than the diameter, length, width, and height of the interior volume of the body 11 to insure that concrete completely surrounds the reinforcement 56. Reinforcement structure 56 may be constructed of a variety of different suitable materials including but not limited in use to, metals, polymers, fiberglass, carbon fibers, metal/plastic composites, and other materials that perform the same desired functions.

After positioning of all components within the concrete form, a concrete mixture, typically but not necessarily a high grade concrete mixture, is poured into the main concrete form, surrounding the entirety of the main interior reinforcing components.

Once the concrete is at least partially cured or hardened, the base 10 is removed from the form, is allowed to cure fully and, optionally, is finished by a variety of methods including but not limited to, texturing, staining, etching, polishing, glazing, sealing, color coating, and other finish methods.

Body 11 may be manufactured using concrete of numerous types and composition mixes having various combinations of ingredients such as cement, water, cementitious materials, and chemical and or mineral admixtures or coloring agents. Concrete usable for manufacturing the concrete base of this invention may be regular concrete, including high grade concrete, and it may be polymer concrete or a wide variety of other concrete types, including, without limitation, high strength concrete, high performance concrete, ultra-high-performance concrete, glass concrete, asphalt concrete, rapid strength concrete, geopolymer concrete and green concrete. Other types of concrete and materials other than concrete also may be used, provided that such materials provide appropriate mass, strength and ability to hold the channels and other components required for the poles to be supported and the conditions of the intended installation.

Body 11 and base 10 may be manufactured in a variety of shapes other than cylindrical, including, but not limited to, triangular, square, pentagonal, hexagonal, heptagonal, octagonal, rectangular or any other polygonal shape, or ovoid, elliptical or another rounded shape, as viewed from the top or in cross section. Body 11 and base 10 shapes other than round may resist rotation in situ better than entirely round shapes. Body 11 may be irregular along its length and may have yet other shapes, including, for instance, a truncated cone tapering from its bottom up, as well as other shapes that provide the needed strength, stability and other properties desired or needed for a particular pole base.

This invention is intended to be used for applications including, but not limited to, as a mounting and stabilizing support for light poles, sign posts, sign panels, traffic light poles, flag poles, radar equipment mounting poles, communication equipment mounting poles, solar panel array mounting poles, wind turbine poles, or other applications for mounting, support and stabilization.

The X-shaped configuration of channels (easily seen in FIG. 2) can be used in cast-in-place concrete or other structures to provide the attachment structure for a variety or range of base plate 48 sizes and bolt receiving hole 50 spacings.

Figure 6:
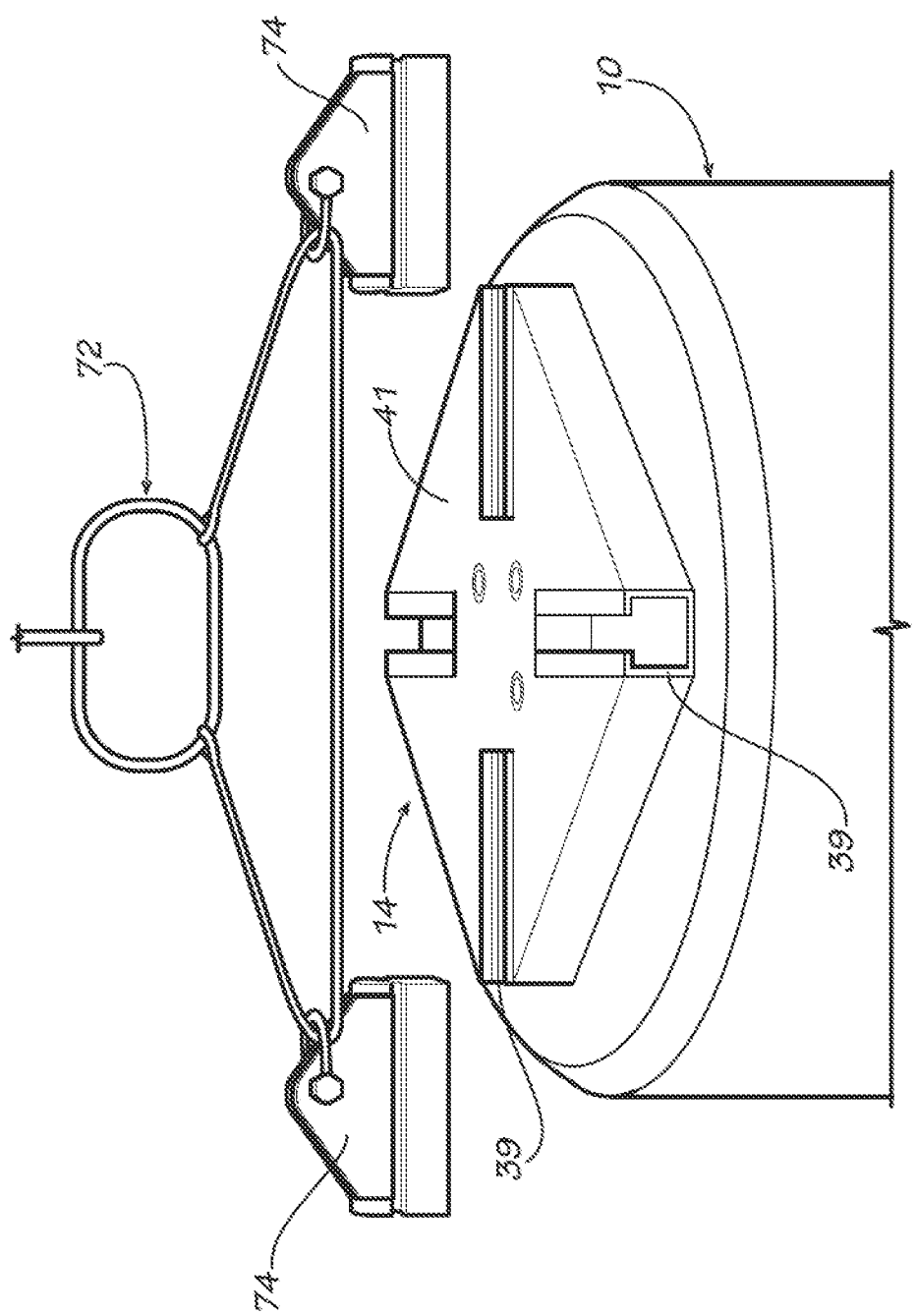
FIG. 6 is a perspective view of the top of the base depicted in FIG. 1 with lifting tackle positioned for insertion.
Figure 7:
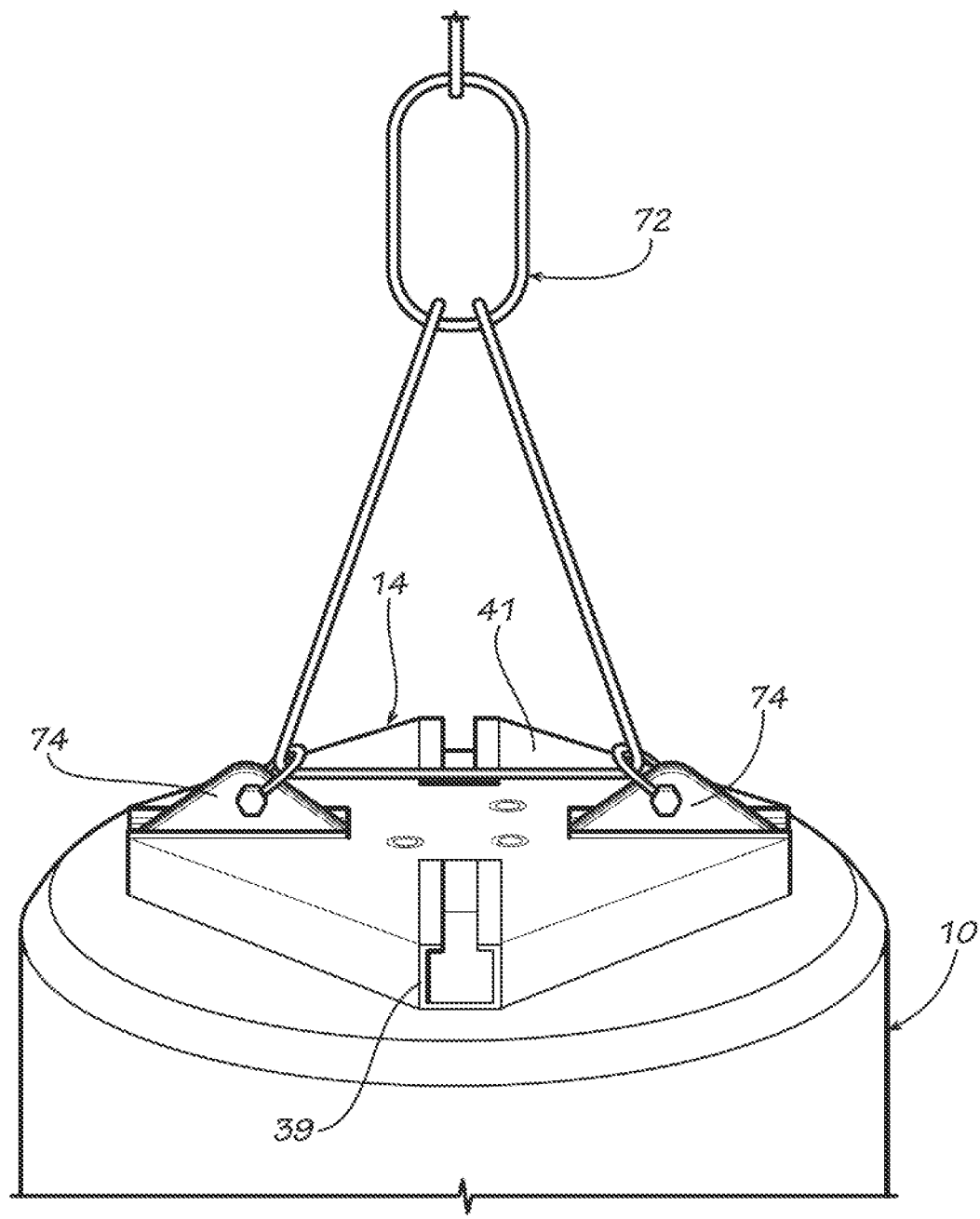
FIG. 7 is a perspective view of the top of the base depicted in FIG. 1 like FIG. 6 but with lifting tackle inserted for lifting the base.

Pole base 10 may be installed by lifting the base 10 by a lifting harness 72 attached to eye-bolts, Tee-cross section slot-fillers 74 or other hardware temporarily attached to one or more of channels 34, as depicted in FIGS. 6 and 7. The base 10 is lowered into a previously excavated hole. Soil, concrete or other suitable fill material is then placed in the hole to secure the base in an upright position. If the body 11 has any recesses 18 or 20, the fill material will occupy such recesses.

A pole having a square arrangement of stud or bolt-receiving mounting holes, such as pole 46, may be installed on the base 10 by positioning one anchor bolt or stud 52 in each of the four channel sections 34 (as shown in FIGS. 3 and 4) with an end of each stud facing upward and positioning the pole base 48 above and near the channel sections 34. Before or after positioning the pole base 48 near the channel sections, each of studs 52 may be slid into and positioned in the channel 34 within which it is located so that the stud 52 can be received in one of the pole base holes 50. The pole 46 may then be lowered so that the pole base 48 holes 50 receive the studs 52 with one of the studs 52 positioned in each of the four base structure holes 50. The fasteners are then tightened so as to hold the pole base 48 securely connected to the channels.

Alternatively, as is generally illustrated in FIG. 10, the nut and bolt can be turned over so that a bolt shank is passed through the top of a pole base, into a channel and into a nut or washer and nut in the channel.

Furthermore, the base of this invention can be manufactured with channels having numerous other cross-sectional shapes provided that an X-shaped arrangement of channels is provided to accommodate differing sizes and hole or fastener arrangements in pole bases.

Other embodiments of the pole base of this invention may use fastener arrangements that are not adjustable together with other aspects of the invention described and/or depicted herein and in the accompanying drawings.

The ability of the base 10 of this invention to receive and securely hold poles with different sizes of square arrangements of mounting holes, affords versatility in use of the base and permits a first pole mounted on the base to be replaced by a pole with different size hole arrangements. It also permits a damaged pole or a pole secured with damaged or broken studs to be replaced or remounted without replacing or repairing the base.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

For instance, one or both of the recesses 22 can be omitted or can have different proportions and different shapes. Where there are two recesses 22, they do not have to have the same shape.

"Soil" used to backfill a hole within which a pole base of this invention is positioned can be any fluid, granular or similar material suitable for securing the pole base in a stable, upright position so that the base can resist any uplift or tilting forces exerted on the base or a pole attached to it. Accordingly, "soil" includes earth, dirt, stone or other aggregate, concrete and any other suitable material. Holes within which pole bases of this invention are positioned can be excavate in undisturbed earth (including loose soil, stone, rock and other materials), in fill, in other naturally occurring or human-made structures like parking lots.

The invention claimed is:

1. A pole base comprising:
 (a) a body comprising a top, and
 (b) a pole attachment structure comprising at least four channels embedded in the top of the body and arranged in an X-shaped arrangement such that each of the at least four channels extends across at least one quarter of a width of the top of the body and such that each of the at least four channels is fixed with respect to the body and wherein each of the at least four channels is configured to slideably interface with at least one fastener along a length of the channel.

2. The pole base of claim 1, wherein the at least one fastener is removable and each of the at least four channels has a U-shaped cross section.

3. The pole base of claim 2, wherein each of the at least four channels comprises steel and the body is cylindrical and comprises concrete with reinforcing steel contained within the body.

4. The pole base of claim 1, wherein the at least four channels are arranged so that a plurality of different sizes of generally square pole base plates or other structures having a square arrangement of four holes can alternatively be attached to the channels with one fastener extending through each of the four holes and secured to one of the at least four channels.

5. The pole base of claim 4, further comprising an indicium on the body to indicate an appropriate depth of burial of the base.

6. The pole base of claim 5, wherein the indicium comprises a V-shaped notch.

7. The pole base of claim 5, wherein the indicium comprises a metal piece embedded in the body.

8. The pole base of claim 7, wherein the metal piece projects past an outer surface of the body and comprises one or more painted markings.

9. The pole base of claim 4, further comprising at least one conduit contained within the body and having two ends, one of which ends is open at the top of the body and the other of which ends is open to a side or a bottom of the body.

10. The pole base of claim 9, wherein one of the two ends of the at least one conduit is at the top of the body and another of the two ends of the at least one conduit is open to the side of the body such that an axial direction of the at least one conduit is oblique with respect to an axial direction of the body.

11. The pole base of claim 4, wherein the body comprises at least one recess.

12. The pole base of claim 11, wherein the at least one recess comprises a planar portion.

13. The pole base of claim 4, wherein the body comprises at least two recesses, each comprising a planar portion.

14. The pole base of claim 1, wherein the body is generally polygonal in cross section.

15. The pole base of claim 14, wherein the polygonal cross section is square.

16. The pole base of claim 1, wherein each of the at least four channels is flush with the top of the body.

17. A pole base comprising:
 (a) a body comprising a top, and
 (b) a pole attachment structure comprising at least four slots permanently disposed in the top of the body and arranged in an X-shaped arrangement such that each of the at least four slots extends across at least one quarter of a width of the top of the body and such that each of the at least four slots is fixed with respect to the body and wherein each of the at least four slots is configured to slideably receive at least one fastener along a length of the slot,
 wherein the at least four slots are configured such that a plurality of different sizes of pole base plates or other structures can alternatively be attached to the at least four slots with the at least one fastener extending through each of the pole base plate or other structure and secured to one of the at least four slots.

18. The pole base of claim 17, wherein the at least one fastener is removable and each of the at least four slots has a U-shaped cross section.

19. The pole base of claim 17, wherein each of the at least four slots comprises steel and the body is cylindrical and comprises concrete with reinforcing steel contained within the body.

20. The pole base of claim 17, wherein each of the at least four slots is flush with the top of the body.

21. The pole base of claim 17, further comprising an indicium on the body to indicate an appropriate depth of burial of the base.

22. The pole base of claim 21, wherein the indicium comprises a V-shaped notch.

23. The pole base of claim 21, wherein the indicium comprises a metal piece embedded in the body.

24. The pole base of claim 23, wherein the metal piece projects past an outer surface of the body and comprises one or more painted markings.

25. The pole base of claim 17, further comprising at least one conduit contained within the body and having two ends, one of which ends is open at the top of the body and the other of which ends is open to the side or bottom of the body.

26. The pole base of claim 25, wherein one of the two ends of the at least one conduit is at the top of the body and another of the two ends of the at least one conduit is open to the side of the body such that an axial direction of the at least one conduit is oblique with respect to an axial direction of the body.

27. A pole base comprising:
 (a) a body comprising a top, and
 (b) at least four slots embedded in the top of the body and arranged in an X-shaped arrangement such that each of the at least four slots extends across at least one quarter of a width of the top and such that each of the at least four slots is fixed with respect to the body and wherein each of the at least four slots is configured to slideably interface with at least one fastener along a length of the slot.

* * * * *